United States Patent [19]

Lawrence

[11] 4,337,674
[45] Jul. 6, 1982

[54] LATERAL TUBE TRANSMISSION CONTROL

[76] Inventor: Roger W. Lawrence, 30 E. Cliff St., Somerville, N.J. 08876

[21] Appl. No.: 166,166

[22] Filed: Jul. 7, 1980

[51] Int. Cl.[3] ................. G05G 5/10; G05G 5/18
[52] U.S. Cl. .................... 74/475; 74/477; 74/527; 74/528; 403/324; 403/328
[58] Field of Search ........... 74/475, 477, 527, 528; 70/194, 195, 199, 200, 247; 403/324, 328

[56] References Cited

U.S. PATENT DOCUMENTS

| T973,003 | 8/1978 | Kelly et al. | 70/200 |
|---|---|---|---|
| 1,499,427 | 7/1924 | Tullar | 70/195 |
| 1,818,241 | 8/1931 | Moulton | 74/475 |
| 2,463,728 | 3/1949 | Wallin | 74/528 X |
| 2,989,876 | 6/1961 | Rasmussen | 74/477 |

FOREIGN PATENT DOCUMENTS 220855  8/1924  United Kingdom ............ 74/528

*Primary Examiner*—Allan D. Herrmann

[57] ABSTRACT

A lateral tube transmission control which is adopted for use on conventional automotive transmissions which consists of individual shift levers for each pair of gear sets. Each lever is equipped with a locking device which automatically locks the lever in either a neutral position or an engaged position when the lever is moved to a predetermined position. The levers transmit this movement to the transmission linkages through a concentrically mounted shaft and tubes.

3 Claims, 4 Drawing Figures

LATERAL TUBE TRANSMISSION CONTROL

BACKGROUND OF THE INVENTION

1. Field of Invention

The present invention relates generally to mechanisms for selecting gears in transmissions. More particularly, it relates to an apparatus for selecting a gear and holding the gear selection in automotive manual type transmissions, especially for automobile racing applications.

2. Background Art

Conventional automotive gear selection mechanisims, called Shifters permit a driver via a shift lever to selectively engage gears in the transmission. The other gears which are not engaged are left in a neutral or disengaged position. These conventional shifters generally position gears in the transmission through linkages between arms on the shifter positioned by the shift lever and selection arms attached to shifting shafts in the body of the transmission. These shafts are usually held in place within the transmission by spring loaded detents. These detents are the sole means of holding gears in position. In addition, certain types of conventional shifters have features which prevent unintended engagement of the reverse gear set and/or selection of the neutral position by the driver. These features generally prevent the shift lever from being moved to the reverse or neutral position without releasing a stop. There is generally nothing incorporated in conventional shifters to prevent movement of the shift, lever, arms, linkages or shafts.

Conventional shifters with or without these features have the following drawbacks. In certain racing applications, especially in dirt track racing, irregular track surfaces, frequent contact between competing cars and rapid engine speed variations constantly impose stresses on the race car. These stresses often overcome the relatively weak restraints provided by the spring loaded detents and cause transmissions with conventional shifters to jump out of gear or cause two gear sets in the transmission to engage simultaneously. When a transmission jumps out of gear, loss of control often ensues because steering is accomplished by a combination of steering with the front wheels and slippage of the spinning rear wheels. This slippage of the rear wheels is controlled by the driver's use of the throttle to control engine speed which is transferred through the transmission to the rear wheels. When the transmission jumps out of gear into neutral, this steering function of the rear wheels is lost resulting in loss of control over the car. Often this results in a accident with serious damage to one or more cars on the track and in some cases injury to the drivers. In addition, since the engines are often operating near their maximum RPM limit when the transmission suddenly jumps out of gear the engine almost instantly exceeds its maximum RPM limit, and extensive mechanical damage to the engine can and often does result.

The second drawback mentioned above, the accidental engagement of more than one gear at a time in the transmission is also encountered with conventional shifter mechanisms. Here again, the imposed stresses overcome the restraints of the detents, the unrestrained shiftarm of a conventional shifting mechanism which locates a controlled gear set in a neutral position is jarred into an engaged position. When this occurs the transmission is almost invariably seriously damaged and the driver experiences a loss of control similar to that described when the transmission jumps out of gear.

Another problem that is associated with conventional shifter mechanisms is hanging up a gear; that is the occasional inability to disengage a gear selection. This occurs when either the shifter suffers from excessive wear or slippage occurs between the shaft that enters the transmission and the shift arm attached to it. When hangups occur, the conventional shifter with a single shift lever, can not function to disengage the gear set already engaged while simultaneously engaging another gear set which is activated by a separate shift arm. This occurs because the wear or slippage prevents the adjacent shift arms in the shifter from aligning properly so that the shift lever can move from one arm to engage the second arm to effect disengagement of one gear set and engagement of the other.

SUMMARY OF INVENTION

The present invention, which overcomes the problem of jumping out of gear, simultaneous engagement of a second gear set, and gear hang up comprises individual gear selection levers, each of which is attached to a horizontal shaft or tube. These shifts and/or tubes as assembled so as to be concentric with each other. Each lever has a corresponding locking mechanism and each of the shafts and/or tubes has an mechanism whereby they lock into specific positions relative to each other. This locking action occurs automatically when the lever is brought into the proper position by the driver. Once locked, the driver must disengage the lock to reposition the lever. An arm is mounted at the end of each of the shafts or tubes, opposite from the point of attachment of the selection levers. These arms transmit the motion of each of the selection levers with a conventional linkage to the gear selection arms on the transmission.

This invention permits the gear shift levers to automatically lock in place during use and thereby positively hold the transmission gear selection arms so that they can not be moved by the jostling and stresses that normally affect conventional shifter mechanisms.

This invention incorporates an individual shift lever to select between each pair of coupled gear sets. This feature permits the driver to positively engage and disengage each pair of coupled gear sets totally independently of one another even if the gear selection arm has slipped on the transmission shifting shaft.

Accordingly, an object of the present invention is to provide an improved gear selection mechanism which positively locks gear selections into place.

Another objective of the present invention is to provide an improved gear selection mechanism which positively locks unused gear sets in the neutral or disengaged position.

Yet another object of the present invention is to provide an improved gear selection mechanism which automatically engages a locking mechanism to hold the desired gear selection.

Still another object of the present invention is to provide an improved gear selection mechanism which automatically engages a locking mechanism to hold an unused gear set in the disengaged or neutral position.

Yet another object of the invention is to provide an improved gear selection mechanism which avoids the possibility of multiple gear engagement and prevents damage to the transmission.

Yet another objective of the invention is to provide an improved gear selection mechanism which allows the operator to manipulate each pair of gear sets in a transmission independently from other pairs.

Yet another objective of the invention is to provide an improved gear selection mechanism which minimizes the possibility of loss of control of the vehicle.

These and other objects and features of the present invention will become apparent from the following detailed description and accompanying drawings.

DETAILED DESCRIPTION OF THE INVENTION

Figure 1:
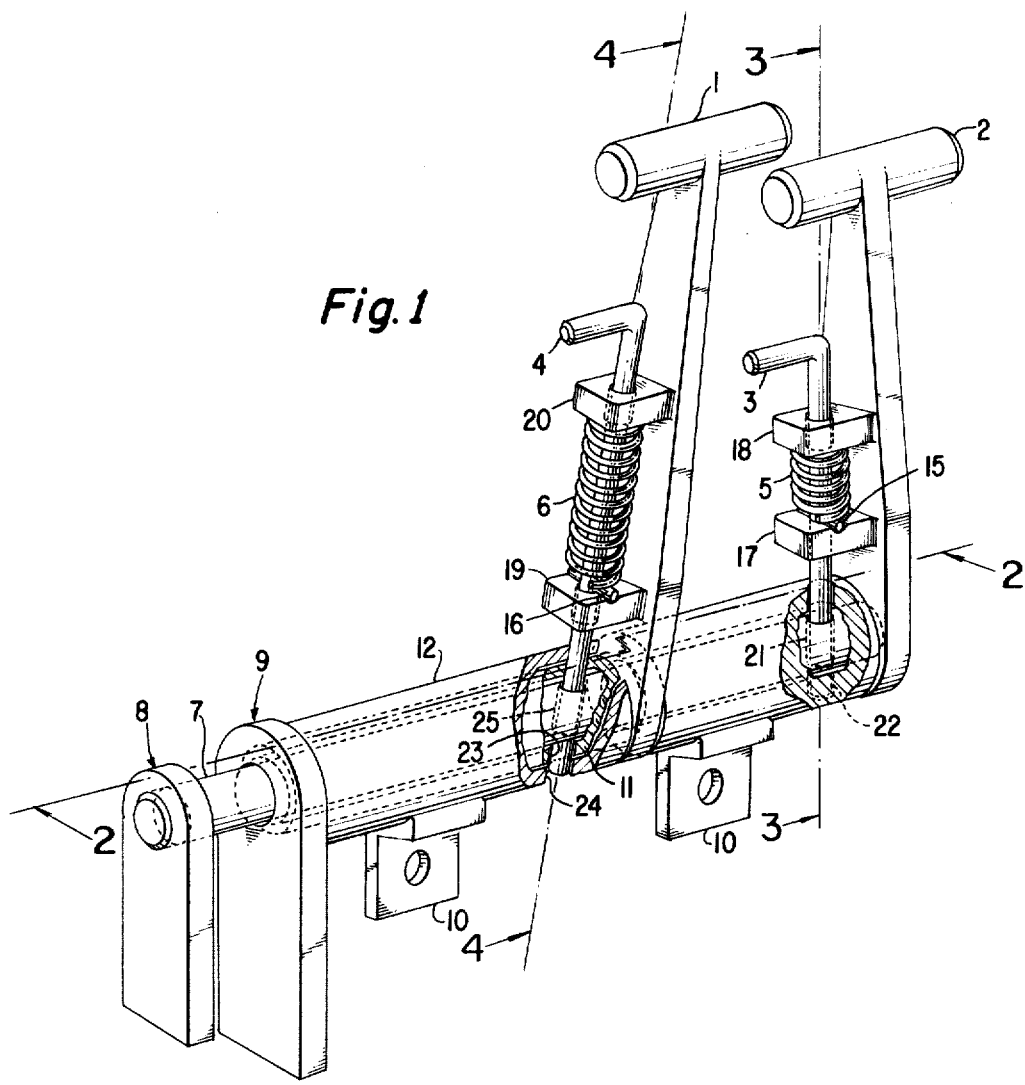
FIG. 1 shows a pictoral perspective view of the lateral tube transmission control with the first-reversed lever locked in the neutral position and the second-third lever locked in the third gear position mounted on a conventional three speed transmission with conventional linkages connecting the lateral tube transmission control to the arms on the transmissions.
Figure 2:
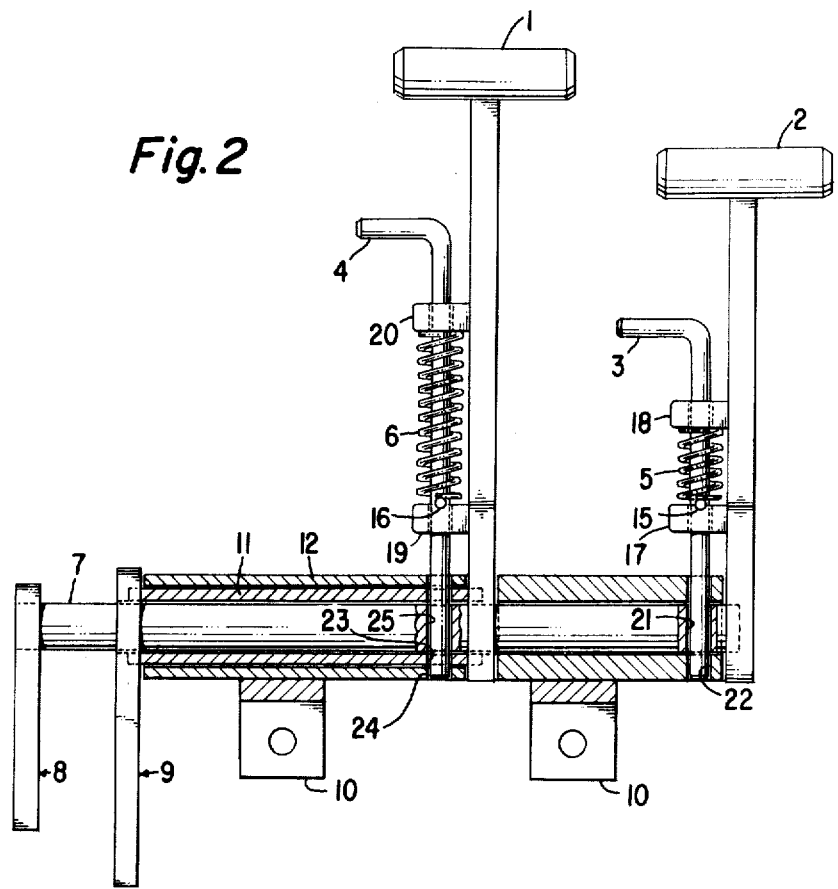
FIG. 2 shows a cross section elevation view through Section 2 in FIG. 1 showing transmission control including the various elements in assembly form.

Refering now to the drawings which depict the present invention in an embodiment suitable for use on a conventional typical three forward speed automotive transmission, there is shown on FIG. 2 a cross section elevation view of the lateral tube transmission control wherein there is rotatable tube 11 having one end attached to a lever 1 and the other end attached to an arm 9 for transferring the motion of said lever 1 to said arm 9 and then through a conventional linkage to the transmission for selecting between the second and third, or high, gear sets. Said tube 11 is concentrically located around a rotatable shaft 7 having one end attached to a second lever 2 and the other end attached to a second arm 8 for transferring the motion of said lever 2 to said arm 8 and then through a conventional linkage to the transmission for selecting between the first, or low, and reverse gear sets. The above said shaft 7 and tube 11 are rotatably mounted inside a housing 12. Said housing has a mounting 10 attached thereto to permit detachable connection to the conventional automotive transmission.

Figure 3:
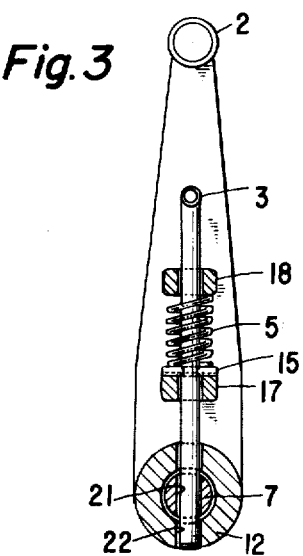
FIG. 3 shows a cross sectional view through Section 3 in FIG. 2 showing the locking mechanism in the engaged positions.

The above said shaft 7 has a diametrical hole 21 of a size suitable for the insertion of locking pin 3. Locking pin 3 is located adjacent to the point of attachment of said second lever 2 and is oriented parallel to the center line of said second lever 2. The housing 12 has a transverse hole 22 of a size suitable for the insertion of said locking pin 3 also located adjacent to the above said second lever 2 so that said locking pin 3 can be inserted through said housing 12 and said shaft 7 thereby preventing the rotation of said shaft 7 and locking said shaft 7 at the approximate midpoint of said shaft 7's range of rotation so that said lever 2 is held in an approximately vertical position corresponding to the neutral position for the first and reverse gear sets. Said locking pin 3 is slidably mounted on said second lever 2 by means of an upper guide 18 and a lower guide 17 and is impressed towards said housing 12 into said hole 22 and through said hole 21 by a spring 5 which bears on a spring retainer 15 attached to said locking pin 3 and on upperguide 18 to automatically lock said shaft 7 when said locking pin 3 is alligned and inserted into with said holes 21 and 22 as illustrated in FIG. 3.

Another locking pin 4 is slidably mounted on said lever 1 by means of an upper guide 20 and a lower guide 19. Said locking pin 4 is also impressed towards said housing 12 by a spring 6 which bears on a spring retainer 16 attached to said locking pin 4 and on said upper guide 20.

Figure 4:
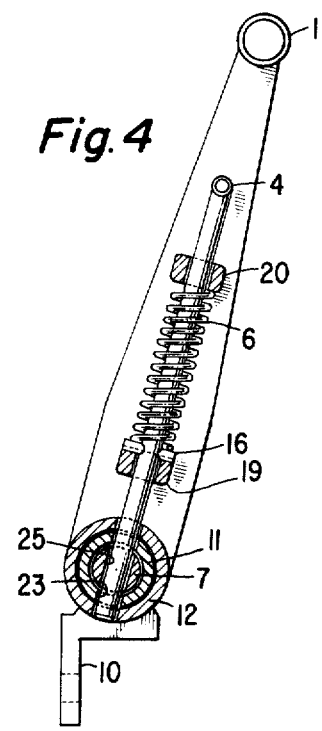
FIG. 4 shows a cross sectional view through Section 4 in FIG. 2 showing the locking mechanism in the engaged positions.

Said tube 11 has a diametrical hole 23 of a size suitable for the insertion of said locking pin 4. Said locking pin is oriented parallel to the center line of said lever 1 and located adjacent to the point of attachment of said lever 1 to said tube 11. In addition, the above said housing 12 has a second transverse hole 24 of a size suitable for the insertion of said locking pin 3 also located adjacent to the above said lever 1 and said shaft 7 has a second diametrical hole 25 of a size suitable for the insertion of said locking pin 4 also located adjacent to the above said lever 1, so that the above said locking pin 4 can be inserted simultaneously through said housing 12, said tube 11 and said shaft 7 when shaft 7 is locked in the neutral position by the insertion of said locking pin 3 so that said lever 1 is at one approximate end point of said lever 1's range of rotation. At this point said lever 1 is locked in a position corresponding to the third or high gear selection for the second and third gear sets as illustrated in FIG. 4. Said locking pin 4 will automatically be impressed into said holes 23, 24 and 25 by spring 6 when lever 1 is properly alligned with said housing 12 and said second lever 2 is locked at its mid point position. The engagement of locking pin 4 acts as a second lock on shaft 7 preventing rotation relative to housing 12 even if locking pin 3 is retracted from said shaft 7 and housing 12.

From the above description of the structure and operation it is obvious that the lateral tube transmission control offers many improvements over similar devices in the prior art. For example, there is disclosed a lateral tube transmission control which positively and automatically locks a conventional transmission in high gear while simultaneously and automatically locking unused gear sets in a neutral or disengaged position. This lateral tube transmission control also enables a driver to manipulate each pair of gear sets in a conventional transmission independantly from other pairs of gear sets enabling the driver to compensate for gear selection arm slippage and eliminate the normal hangup of gears. The positive locking features of this lateral transmission control also substantially reduces the potential for mechanical damage to a transmission or car and the potential for injury to the driver by virtually eliminating the possibility of unintentional detrimental transmission operation.

It is also obvious from the foregoing description of the structure and opeation that this lateral tube transmission control can be applied to transmissions with more or less than three forward speeds by providing an appropriate number of levers, shafts and or tubes and locking mechanisms for manipulation of either a greater or lesser number of gear sets than that described herein. In addition it is also obvious that more than one locking mechanism can be used with each lever for locking each lever in more than one position.

In the foregoing description, certain terms have been used for brevity, clarity and understanding, but no unnecessary limitations are to be implied therefrom beyond the requiements of prior art, because such words are used for descriptive purposes herein and are intended to be broadly construed.

Moreover, the embodiments of the improved construction illustrated and described herein are by way of example and the scope of the invention is not limited to the exact details of construction. It is, therefore, understood that, within the scope of the appended claims, the invention may be practiced otherwise than as specifically described herein.

What is claimed is:

1. An apparatus for selecting tansmission gear positions comprising:
    (a) one lever;
    (b) one arm;
    (c) a shaft with a diametrical hole;
    (d) a housing with a transverse hole; and
    (e) a locking means which simultaneously engages the diametrical hole in the shaft and the transverse hole in the housing for locking automatically the position of said lever relative to said housing to restrain said lever from moving relative to said housing for positively holding the gear selection made by positioning said lever.

2. An apparatus as set forth in claim 1 comprising:
    (a) a first lever which is attached at one end to;
    (b) a tube with a diametrical hole;
    (c) A second lever which is attached at one end to;
    (d) a shaft with two diametrical holes, said shaft being mounted rotatably inside said tube;
    (e) a housing, with two transverse holes, in which said shaft and tube are rotatably mounted.
    (f) two arms, the first of which is attached to said shaft at the end opposite to that whereon said second lever is attached and the second of which is attached to said tube at the end opposite to that whereon said first lever is attached;
    (g) a first locking means which simultaneously engages one diametrical hole in the shaft, the diametrical hole in the tube and one transverse hole in the housing when engaged for automatically locking the position of said first lever relative to said housing when said first lever is positioned to select high gear in a conventional automotive transmission; and
    (h) a second locking means which simultaneously engages the second diametrical hole in the shaft and the second transverse hole in the housing when engaged for automatically, locking the position of said second lever relative to said housing when said second lever is positioned to select the neutral position in a conventional automotive transmission.

3. An apparatus as set forth in claim 2 comprising;
    (a) at least three levers;
    (b) at least two tubes;
    (c) at least three arms each of which is attached to a shaft or tube at the end opposite to the point of attachment of said levers;
    (d) at least three locking means for locking the position of the levers relative to the housing.

* * * * *